US009622085B2

(12) United States Patent
Alsohaily et al.

(10) Patent No.: US 9,622,085 B2
(45) Date of Patent: Apr. 11, 2017

(54) SYSTEM AND METHOD FOR AUTONOMOUS DYNAMIC WIRELESS SPECTRUM ASSIGNMENT

(71) Applicants: Ahmed Alsohaily, Toronto (CA); Elvino Silveira Medina de Sousa, Toronto (CA)

(72) Inventors: Ahmed Alsohaily, Toronto (CA); Elvino Silveira Medina de Sousa, Toronto (CA)

(*) Notice: Subject to any disclaimer, the term of this patent is extended or adjusted under 35 U.S.C. 154(b) by 113 days.

(21) Appl. No.: 14/636,446

(22) Filed: Mar. 3, 2015

(65) Prior Publication Data
US 2016/0262154 A1    Sep. 8, 2016

(51) Int. Cl.
*H04L 1/00*    (2006.01)
*H04W 16/14*   (2009.01)
*H04W 24/02*   (2009.01)

(52) U.S. Cl.
CPC ............ *H04W 16/14* (2013.01); *H04W 24/02* (2013.01)

(58) Field of Classification Search
CPC ............... H04B 7/2121; H04B 7/2123; H04J 2203/0069; H04Q 2213/394; H04W 72/04; H04W 72/12
USPC .......... 370/329, 330, 341, 343; 455/446–450
See application file for complete search history.

(56) References Cited

U.S. PATENT DOCUMENTS

2003/0211831 A1* 11/2003 Xu .................. H01Q 1/246
                                                              455/63.3

* cited by examiner

*Primary Examiner* — Dady Chery
(74) *Attorney, Agent, or Firm* — Anil Bhole; Bhole IP Law

(57) ABSTRACT

A system and method for autonomous dynamic spectrum assignment for operating and configuring a cellular wireless communication network, employing multiple Radio Access Technologies (RATs). The method consists of: partitioning the system radio frequency resources (spectrum) into fixed and pooled spectrum blocks; autonomously assigning pooled spectrum blocks at individual system access points or radio units or groups thereof; dynamically adapting the assignment of pooled spectrum blocks at individual system APs/RUs or groups of APs/RUs; implementation of the pooled block assignment function and integration with radio resource assignment functions of co-deployed RATs.

17 Claims, 10 Drawing Sheets

SYSTEM AND METHOD FOR AUTONOMOUS DYNAMIC WIRELESS SPECTRUM ASSIGNMENT

TECHNICAL FIELD

The following relates generally to wireless communication spectrum assignment and more specifically to the autonomous dynamic wireless spectrum assignment.

BACKGROUND

Specific radio frequency bands are set aside for wireless cellular communications by the spectrum regulatory authorities (such as the Federal Communications Commission in the United States of America) to ensure the reliable operation of cellular systems, and are referred to as cellular bands. The term spectrum is commonly used to refer to the aggregate bands that are assigned to the cellular communication network in any given jurisdiction. Another analogous phrase to spectrum is radio frequency resources.

Cellular bands can be contiguous or non-contiguous and are typically divided into sub-bands, which again can be contiguous or non-contiguous, that are licensed to mobile network operators. A mobile network operator thus deploys the network infrastructure of a cellular system upon obtaining a spectrum utilization license, i.e. a license to use a particular cellular band or sub-band. Connection of User Equipment (UE) to system Access Points (AP) or Radio Units (RU) is then facilitated by a wireless radio air interface, referred to as the Radio Access Technologies (RAT), which utilizes a specific amount of spectrum. Such a RAT specifies the sets of signals, in terms of modulation, coding, multiple access, and all associated protocols required to achieve communication over the electromagnetic wireless transmission medium. Each AP could support one or more RAT and generally assigns bands or sub-bands to each of the RATs based on some manual pre-configuration that is usually based on a historical and/or projected usage for each RAT; RATs with more usage would be assigned more spectrum, and vice versa.

RATs are characterized by the required transmission bandwidth, transmission frame duration, frequency reuse factor between APs, user multiple access scheme, modulation and coding configurations along with the transmission and reception protocols. Due to the limited amount of spectrum available for cellular systems, RATs are designed with the objective of enabling maximal spectrum reuse at all system APs/RUs while having the highest possible spectral efficiency.

Due to variations in the capabilities of UE, multiple RATs are typically co-deployed in cellular systems. This consequently requires the partitioning of spectrum between co-deployed RATs. In most implementations, each RAT is assigned one or more blocks of spectrum, the bandwidth for each RAT typically being determined at the time of deployment, or perhaps manually reconfigured from time to time, to reflect typical usage of those RATs in the network. Spectrum partitioning between co-deployed RATs is typically applied at the system level, i.e. all system APs/RUs have the same spectrum partitioning between co-deployed RATs.

To improve spectrum utilization in multi-RAT systems, spectrum assigned to RATs experiencing continuously declining traffic demand is gradually deducted and reassigned at the system level to RATs with continuously increasing traffic demand in a process referred to as spectrum refarming. Multiple realizations of system-level spectrum refarming, with varying implementation complexity have been introduced. However, system-level spectrum partitioning between co-deployed RATs limits the amount of spectrum that can be deducted from a RAT; as the system must meet the traffic demand of all RATs at all system APs/RUs in all times. Therefore, the gains from spectrum refarming are limited to the long-term phase-out of technologies with declining traffic demand.

SUMMARY

In one aspect, a system for autonomous spectrum assignment for a cellular wireless communication network is provided, the system comprising a radio resource management unit configured to: segment an available spectrum into a plurality of spectrum blocks comprising a set of fixed blocks and a set of pooled blocks; assign at least one of the fixed blocks to each of a plurality of supported radio access technologies; determine traffic conditions for the plurality of supported radio access technologies; and assign each of the pooled blocks to one of the radio access technologies on the basis of the traffic conditions.

In another aspect, a method for autonomous spectrum assignment for a cellular wireless communication network is provided, the method comprising configuring a radio resource management unit to: segment an available spectrum into a plurality of spectrum blocks comprising a set of fixed blocks and a set of pooled blocks; assign at least one of the fixed blocks to each of a plurality of supported radio access technologies; determine traffic conditions for the plurality of supported radio access technologies; and assign each of the pooled blocks to one of the radio access technologies on the basis of the traffic conditions.

In yet another aspect, a system for autonomous spectrum assignment for a cellular wireless communication network co-deploying a plurality of radio access technologies is provided, the system comprising a plurality of access points and radio resource management units configured to assign spectrum at access points irrespective of a corresponding spectrum assignment for each of the other access points.

These and other embodiments are contemplated and described herein. It will be appreciated that the foregoing summary sets out representative aspects of systems and methods for cryptographic suite management to assist skilled readers in understanding the following detailed description.

DESCRIPTION OF THE DRAWINGS

A greater understanding of the embodiments will be had with reference to the Figures, in which.

DETAILED DESCRIPTION

Figure 1:
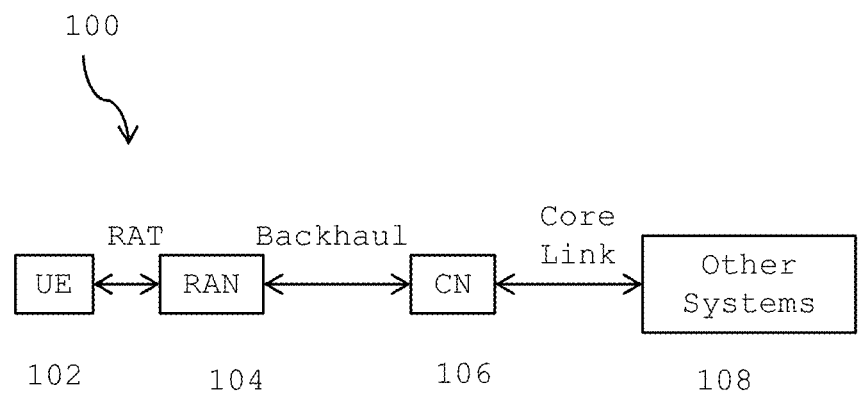
FIG. 1 illustrates an architectural structure of a cellular communication system employing a single RAT.

It will be appreciated that for simplicity and clarity of illustration, where considered appropriate, reference numerals may be repeated among the Figures to indicate corresponding or analogous elements. In addition, numerous specific details are set forth in order to provide a thorough understanding of the embodiments described herein. However, it will be understood by those of ordinary skill in the art that the embodiments described herein may be practised without these specific details. In other instances, well-known methods, procedures and components have not been described in detail so as not to obscure the embodiments described herein. Also, the description is not to be considered as limiting the scope of the embodiments described herein.

It will be appreciated that various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender. Further definitions for terms may be set out herein; these may apply to prior and subsequent instances of those terms, as will be understood from a reading of the present description.

It will be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Further, unless the context clearly indicates otherwise, any processor or controller set out herein may be implemented as a singular processor or as a plurality of processors. The plurality of processors may be arrayed or distributed, and any processing function referred to herein may be carried out by one or by a plurality of processors, even though a single processor may be exemplified. Any method, application or module herein described may be implemented using computer readable/executable instructions that may be stored or otherwise held by such computer readable media and executed by the one or more processors.

The following obviates or mitigates some or all of the foregoing issues in which limited spectrum availability, combined with suboptimal spectrum utilization in multi-RAT cellular systems under system-level spectrum assignment, sub-optimally assigns spectrum. The following provides spectrum assignment at individual APs/RUs and provides flexibility to adapt to system traffic variations and fluctuations, to maximize spectrum utilization in multi-RAT cellular systems.

The following provides a system and method for autonomous dynamic wireless spectrum assignment. In one aspect, the system comprises APs (or RUs, which are hereinafter referred to as "APs" for simplicity) that provide connectivity to UEs and support a plurality of RATs, wherein each AP is autonomously configurable to assign all or a portion of its licensed spectrum (hereinafter, "available spectrum") dynamically among the RATs. The assignment of spectrum can be made at each AP independently of each other AP in the network, such that each AP can be configured to maximize its spectrum utilization without the need to coordinate spectrum assignment with other APs in the system. This avoids issues caused by system-wide spectrum assignment among RATs. Additionally, the available spectrum that is assigned in accordance with the following could be (i) all of the spectrum available to a licensee; or (ii) a subset of the spectrum available to the licensee. In the latter case, the licensee could choose, for various reasons, to apply system-level spectrum assignment for certain RATs on certain bands and apply the following assignment method for other RATs and/or on other bands.

In another aspect, the assignment of the available spectrum for each AP comprises a fixed block portion and a dynamically assigned pooled block portion. The fixed block portion comprises a non-zero minimum spectrum bandwidth assigned to each RAT, and is coordinated at the system level such that system-level service continuity for connected UE is provided. The pooled blocks can be assigned autonomously at each AP among the RATs dependent upon the utilization of each respective RAT at or around the corresponding moment in time.

Referring now to FIG. 1, an exemplary network infrastructure (100) for wireless cellular communication systems is shown. The network comprises a Radio Access Network (RAN) (104) linked to a Core Network (CN) (106). The RAN is deployed to wirelessly connect UE (102) to the CN (106). The RAN (104) carries user traffic to the CN (106), where cellular systems are connected with other communication systems (108), and user traffic management at the CN (106) is independent of traffic originating system.

RANs typically comprise processing units and equipment (such as antennas, circuits, connecting cables, etc.) that provide the following functions: radio transmission, system access control, radio resource management and user mobility management.

Radio transmission functions include: wireless signal transmission and reception, using antennas housed in radio heads; modulation and demodulation of wireless signals using carrier modulation/demodulation circuits; baseband processing of data using baseband processors; and synchronization of system users in frequency and time using synchronization circuits.

System access control includes admission of authenticated users to access and utilize system resources using system user registries.

Radio resource management includes determining which system users have access to radio frequency resources at any time using scheduling functions, with opportunistic scheduling commonly employed in data cellular systems to exploit wireless channel variations.

User mobility management includes maintaining connectivity of mobile users using user connection handover; paging system users to contact the RAN to initiate data transmission sessions; and user location positioning to enable location-based services.

Figure 2:
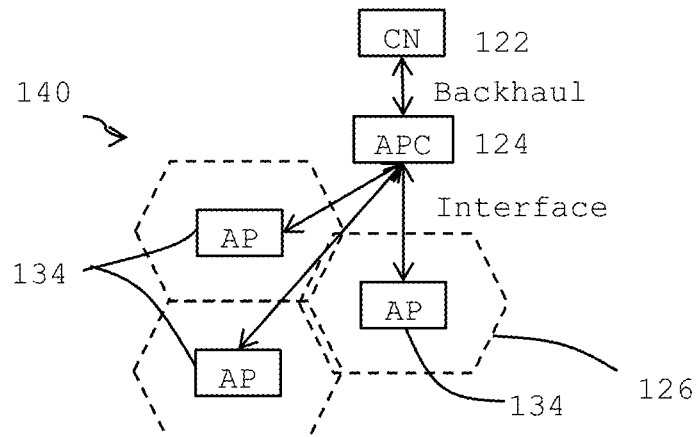
FIG. 2 illustrates a block diagram of three possible RAN architectures.
Figure 2:
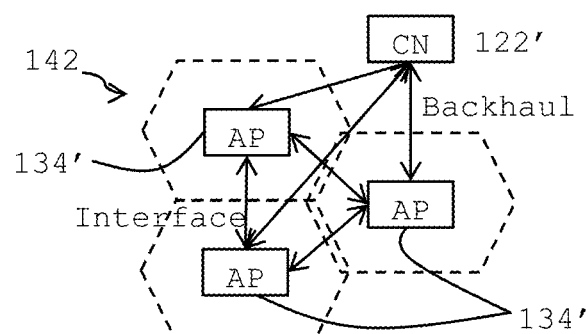
Figure 2:
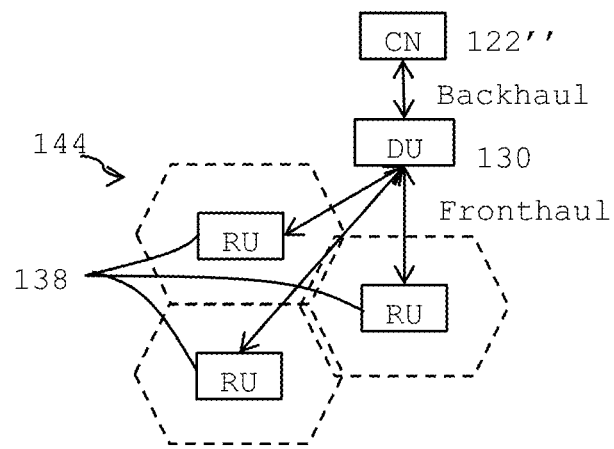

FIG. 2 illustrates three common network topologies for implementing RANs. In FIG. 2(a), a RAN (140) consists of Access Points (APs) (134) that comprise a radio transmission unit for performing radio transmission; and Access Point Controllers (APCs) (124) that comprise a system access control unit, radio resource management unit and user mobility management unit to provide the remaining RAN functions, control the operation of APs and connect APs to the CN (122). APs (commonly referred to as base stations) are deployed to cover specific geographical areas (referred to as cells) (126) and wirelessly connect UE to the CN (122). FIG. 2(b) illustrates a flat RAN architecture (142) where the previously described APC units are instead embedded in APs (134'), with APs connecting directly to the CN (122'). FIG. 2(c) illustrates Centralized RAN (C-RAN) (144), which abstracts APs to RUs (138) comprising radio heads, that perform wireless signal transmission and reception only while connecting to centralized Digital Units (DUs) (130), connected to the CN (122"), where all components performing all other RAN functions are implemented. The choice of RAN architecture typically depends on the performance of network infrastructure hardware and quality of links between network infrastructure elements.

The following description assumes a flat RAN architecture as in element (142), though it is also applicable to other architectures with suitable modifications. Thus, the units and functions described herein may be implemented either in APs, APCs or DUs based on the applicable RAN architecture. In the described embodiment, the AP handles spectrum assignment by way of a radio resource allocation unit; however the radio resource allocation unit could alternatively be provided by the APCs or DUs, or an alternative coordinating component in communication with any of these devices.

Figure 3:
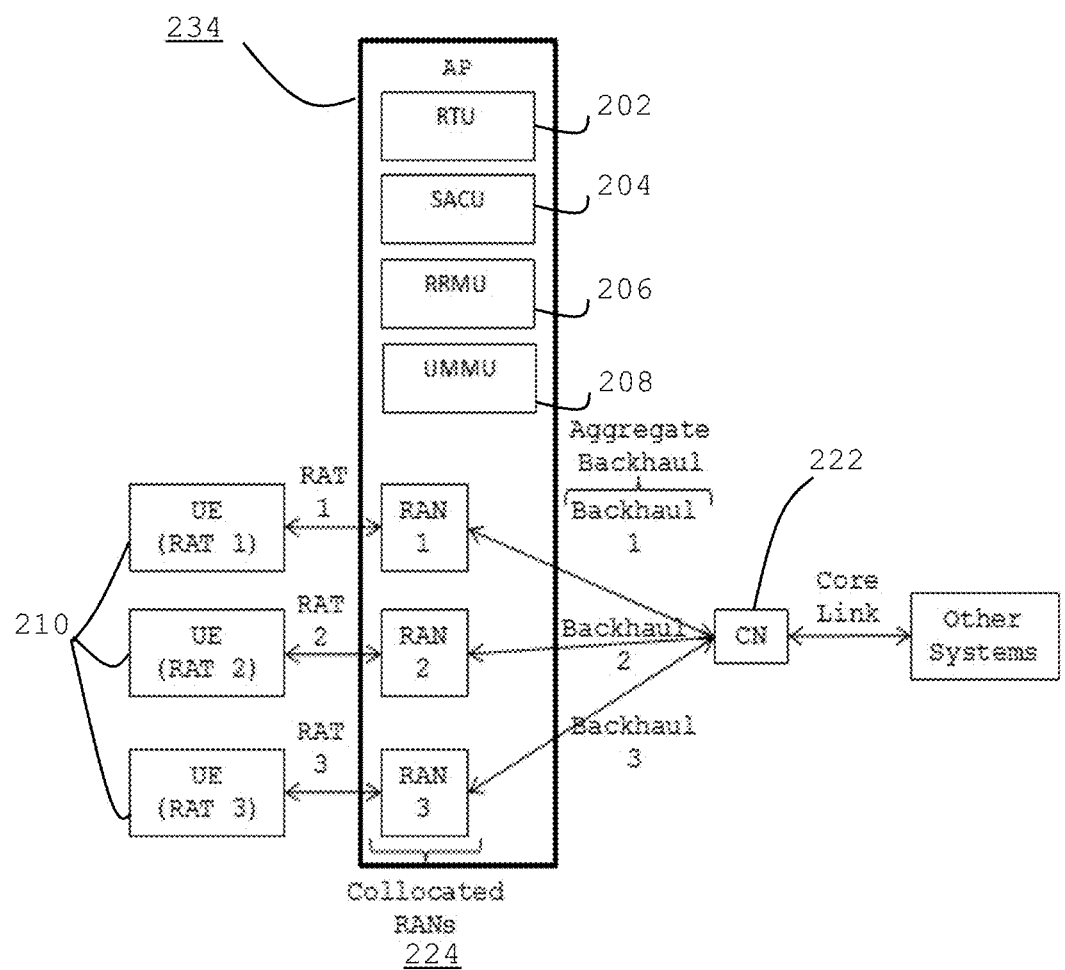
FIG. 3 illustrates an exemplary AP supporting three RATs.

FIG. 3 illustrates the co-deployment of RATs (224) for an exemplary AP (234) linked to a CN (222). The AP comprises a radio transmission unit (202), a system access control unit (204), a radio resource management (206) unit and a user mobility management unit (208). Operation of the radio transmission unit, system access control unit and user mobility management unit is in accordance with existing APs.

The radio resource management unit (206) configures the radio transmission unit (202) to communicate with UEs (210) supporting the supported RATs (224) using one or more blocks of the available spectrum. The assignment of available spectrum to the supported RATs (224) is made autonomously and dynamically by the AP (234).

The assignment of pooled blocks is made on an individual AP basis. However, optionally, each AP may communicate its assignment to other APs via the CN and groups of APs could communicate to implement a common assignment. In either case, the assignment is made in response to network conditions, particularly system traffic reflected as utilization of the available spectrum and utilization of each RAT. In the latter embodiment (of group-based assignment), the assignment could be made on a shared or statistically calculated set, such as the average, of network conditions on each of the APs comprising the group.

Figure 4:
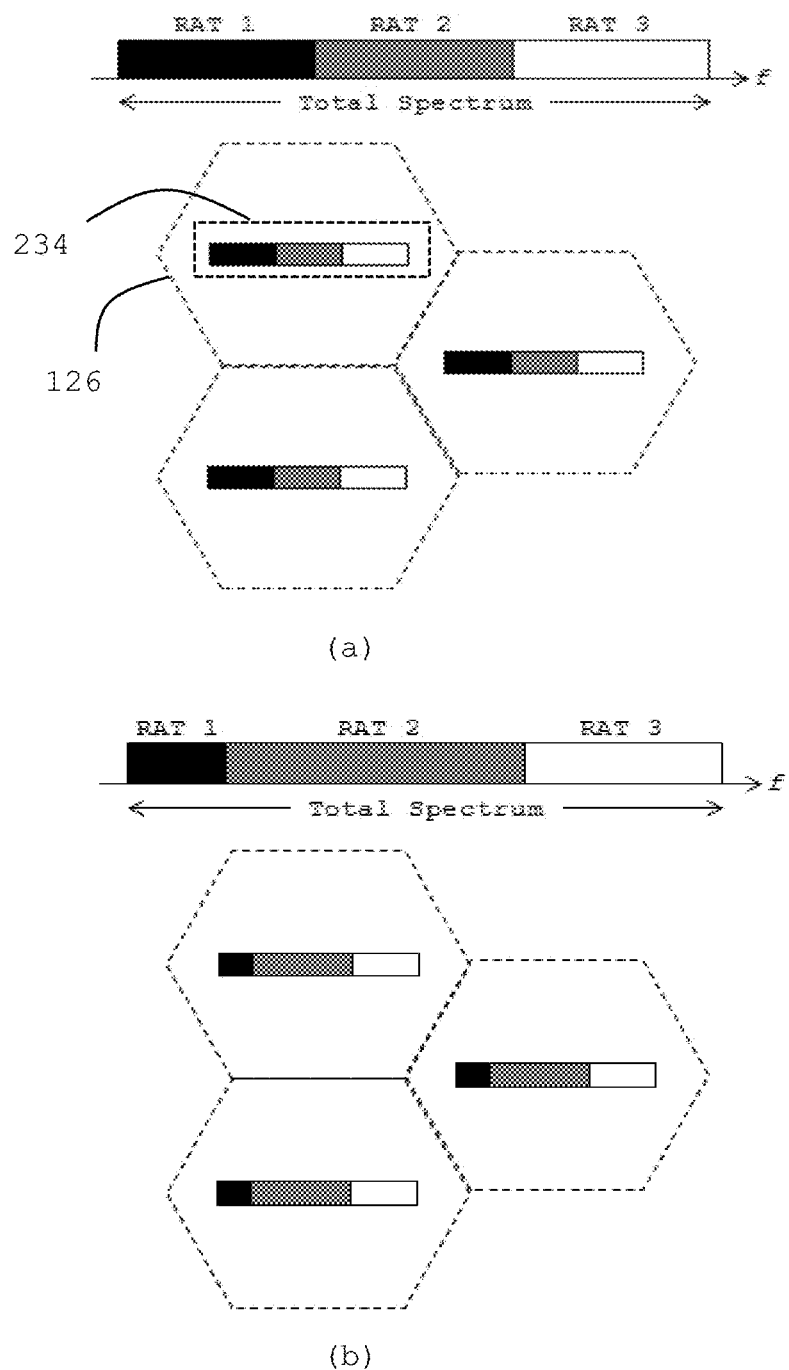
FIG. 4 illustrates system-level spectrum partitioning in a system co-deploying three RATs before and after refarming.

FIG. 4 illustrates an example of a spectral assignment across RATs as would be possible in existing approaches, where system-level spectrum assignment is applied. The bandwidth available to each RAT may be identical, as shown in FIG. 4(a), or differ, as shown in FIG. 4(b) particularly after refarming.

Figure 5:
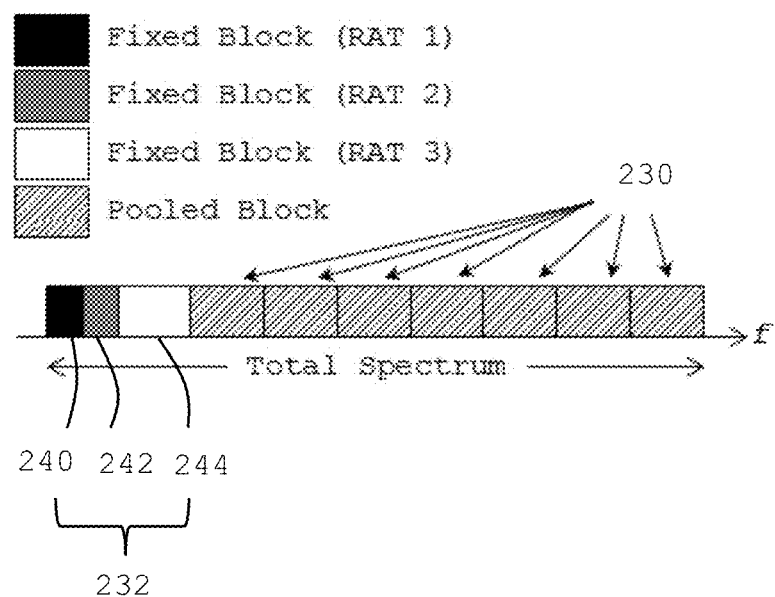
FIG. 5 illustrates spectrum partitioning in a multi-RAT system co-deploying three RATs.

Referring now to FIG. 5, an example of a set of spectral bands is shown in accordance with the system and method provided herein. The radio resource management unit for each AP 234 autonomously and dynamically configures the radio transmission unit of that AP to assign spectrum among the RATs. The radio resource management unit partitions the available spectrum for a cellular system into two sets: a set of fixed spectrum blocks (232) that enable service continuity at the system level for all RATs, and a set of pooled spectrum blocks (230) that enable optimum spectrum assignment reflecting network conditions. Providing the fixed blocks permits all system users to connect to any system AP regardless of UE capabilities, enabling system-level service continuity. The fixed spectrum blocks (232) comprise a fixed block of spectrum (240) assigned to RAT 1, a fixed block of spectrum (242) assigned to RAT 2, and a fixed block of spectrum (244) assigned to RAT 3.

The radio resource management unit communicates with other APs at the system level to select the bandwidth of a fixed block for any RAT. To maximize the number of pooled blocks, and thus maximize spectrum assignment flexibility, the bandwidth of the fixed block for any RAT is chosen to be equal to the RAT carrier bandwidth. APs may communicate with one another through the CN to ensure that fixed blocks are on the same frequencies at all APs or, alternatively, fixed blocks can be pre-assigned manually. The RAT carrier bandwidth is a standard-defined metric equal to the smallest amount of spectrum required for RAT deployment. This means that there is always a minimum assigned bandwidth for each RAT sufficient for the AP to support the RAT. Since fixed blocks are assigned at the system level, system-level service continuity can be provided even in handoff conditions. While larger bandwidths can be chosen for fixed blocks, such a choice would reduce the number of pooled blocks, and thus also reduce the spectrum assignment flexibility.

The radio resource management unit selects the bandwidth of pooled blocks. A preferred implementation selects the bandwidth of each block as being equal to the Least Common Multiple (LCM) of the carrier bandwidths of each RAT supported by the AP. Thus, the number of pooled block, and subsequently the spectrum assignment flexibility, is maximized while ensuring that pooled blocks can be utilized by any of the employed RATs. As in the case of fixed blocks, a bandwidth larger than the LCM of the carrier bandwidths of co-deployed RATs can be chosen for pooled blocks. However, such a choice would also reduce the number of pooled blocks, and thus also reduce the spectrum assignment flexibility.

The radio resource management unit could select fixed spectrum blocks as being contiguous, assigned to different frequency bands (in systems utilizing multiple frequency bands), or separated by pooled spectrum blocks. Systems employing Frequency Division Duplex (FDD) apply the same partitioning for Uplink and Downlink bands.

Figure 6:
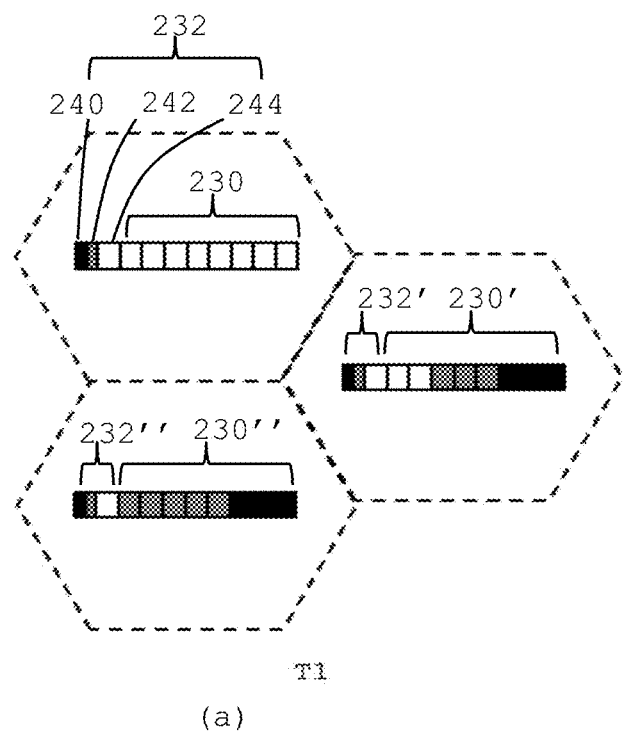
FIG. 6 illustrates autonomous spectrum assignment in a system co-deploying three RATS at two time intervals.
Figure 6:
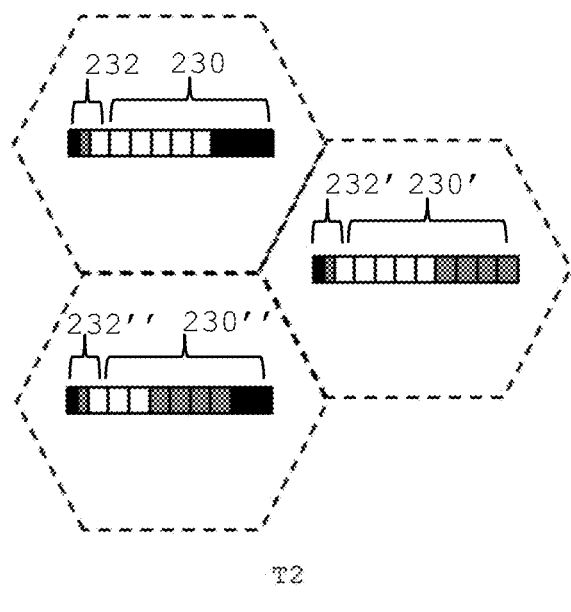

Referring now to FIG. 6, while fixed blocks (232), (232'), (232") are assigned at the system-level, i.e. at all APs in all times, to maintain system-level service continuity, pooled blocks (230), (230'), (230") are autonomously assigned at individual AP or groups of APs. The RAN hardware and links support the assignment of all pooled blocks to any of the employed RATs at any time. The autonomous assignment of pooled spectrum blocks at any individual AP or groups of APs is based on RAT traffic conditions, with the traffic demand for any specified RAT at any specific AP being equal to the sum of the traffic demands generated by system users utilizing the specified RAT when connecting to the specific AP. Additionally, the achievable user throughput rate is determined using the user Channel State Information (CSI) and the spectral efficiency of the user employed RAT.

Figure 7:
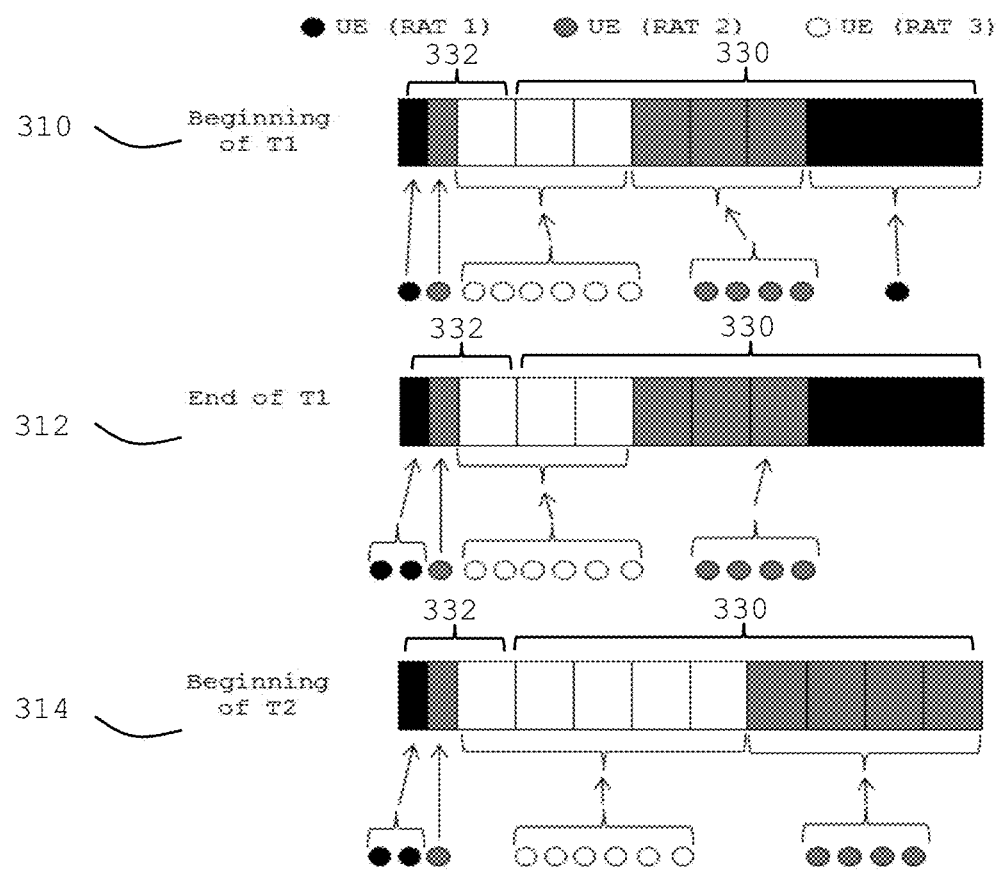
FIG. 7 illustrates user connectivity maintenance when reassigning pooled spectrum blocks.

FIG. 7 illustrates changing RAT spectrum assignment over time at a single AP while maintaining service continuity. The AP has fixed blocks (332) comprising a fixed block for RAT1, RAT2 and RAT3, where the bandwidth of the blocks is approximately the same between RAT1 and RAT2, and approximately twice those for RAT3. At time t=T1 (310) the AP has assigned two pooled blocks to RAT3 which are adjacent to its fixed block, three pooled blocks for RAT2 and three pooled blocks for RAT1. Two UEs are utilizing RAT1 wherein one is connecting at the fixed block and one at one of the pooled blocks assigned to RAT1, six UEs are utilizing RAT2 wherein they are spread among the adjacent fixed and pooled blocks assigned to RAT2, and five UEs are utilizing RAT3 wherein one is connecting at the fixed block and the rest are spread among the pooled blocks assigned to RAT3. Based on the traffic demand of each RAT, pooled block assignment can be proportional to the traffic loading demand of employed RATs such that the number of pooled blocks assigned to a RAT at any specific AP is equal to the RAT traffic demand multiplied by the total number of pooled blocks and divided by the total traffic demand of all RATs at the specific AP (rounded to the closest integer number). In the illustrated case, at the end of time t=T1 (312), the two UEs utilizing RAT1 have both been assigned to the fixed block assigned to RAT1, the six UEs utilizing RAT2 remain spread among the fixed and pooled blocks assigned to RAT2, and the five UEs utilizing RAT3 are spread such that one is in the fixed block and four are connecting through one of the pooled blocks assigned to RAT3. Thus, at the beginning of time t=T2 (314), the radio resource management unit reassigns the spectrum such that no pooled blocks are assigned to RAT1, two additional pooled blocks are assigned to RAT2 and two pooled blocks are removed from RAT3 while three pooled blocks are added for RAT3. Thus, the connected UEs can be more efficiently spread among the spectrum.

Figure 8:
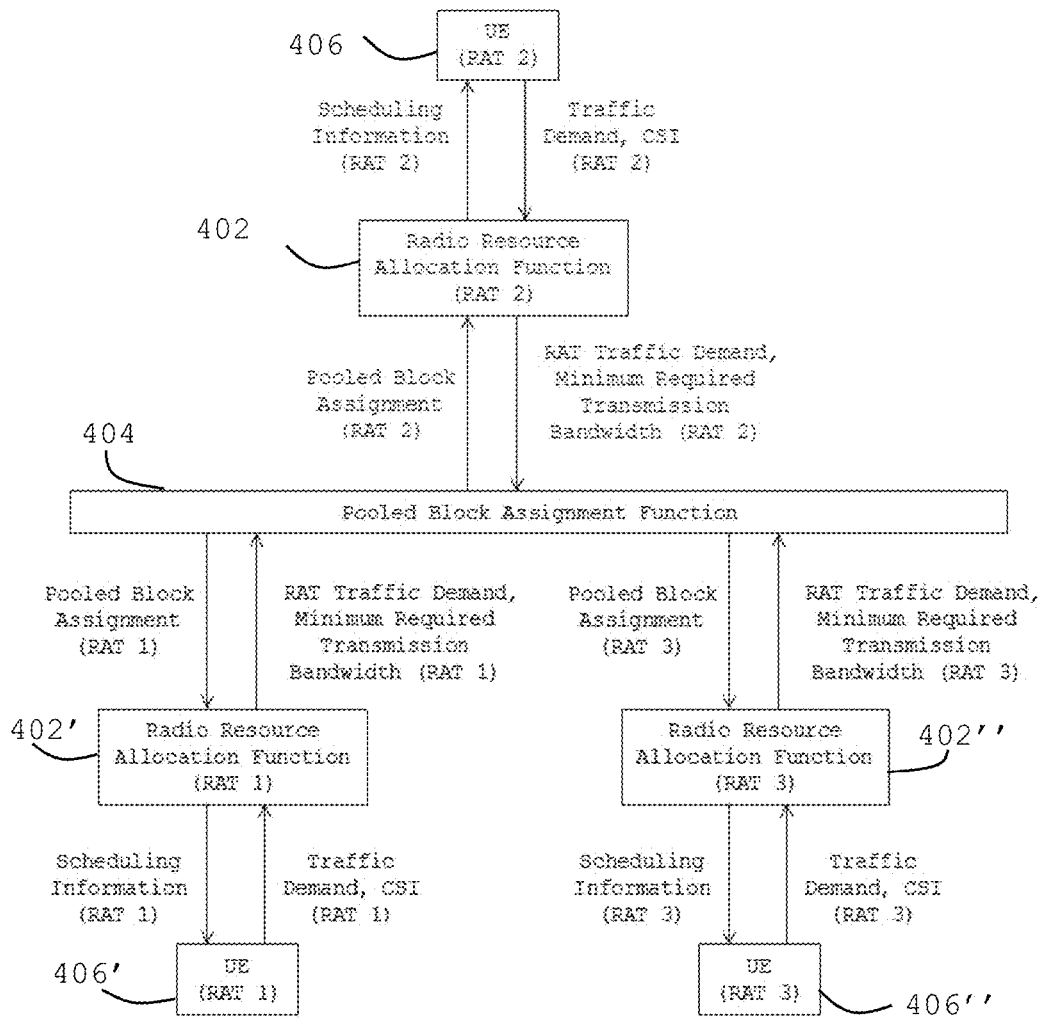
FIG. 8 illustrates pooled block assignment.

Referring now to FIG. 8, a data flow diagram is shown wherein the radio resource management unit implements a radio resource assignment function (402), (402'), (402") for each employed RAT and a pooled block assignment function (404) to coordinate spectrum assignment among RATs. Each UE (406), (406'), (406") corresponds with the AP in the course of cellular communication. The AP obtains from the UE its traffic demand and CSI. The radio resource assignment function (402), (402'), (402") of each RAT utilizes both fixed and pooled spectrum blocks assigned by the pooled spectrum block assignment function (404) to schedule user spectrum access.

The radio resource function (402), (402'), (402") for each RAT determines the aggregate RAT traffic demand on the basis of the traffic demand required by all UEs connecting to that RAT, and the corresponding transmission bandwidth, which is determined by multiplying the RAT traffic demand by the communication bandwidth requirements for the RAT. The radio resource function communicates the RAT traffic demand and the minimum required transmission bandwidth to the pooled block assignment function (404) at the beginning of each assignment frame. The radio resource assignment function (402), (402'), (402") of each RAT determines the RAT traffic demand at each AP by summing individual user traffic demands specified by users in connection requests. The achievable user spectral efficiency is determined using the CSI reported by UE.

The radio resource assignment function (402), (402'), (402") determines the minimum required transmission bandwidth for each user by dividing the user traffic demand by the user spectral efficiency. The pooled block assignment function (404) obtains corresponding information for each RAT.

The pooled block assignment function (404) can assign pooled blocks based on traffic proportions or, alternatively, can favor a specific RAT. When employing proportional pooled block assignment, the pooled block assignment function assigns pooled blocks such that that the number of pooled blocks assigned to a RAT at any specific AP is equal to the RAT traffic demand multiplied by the total number of pooled blocks and divided by the total traffic demand of all RATs at the specific AP (rounded to the closest integer number). On the other hand, when a specific RAT is favored, any non-favored RAT is assigned pooled blocks only if the minimum required transmission bandwidth exceeds the bandwidth of the fixed block for such a RAT. The number of pooled blocks assigned to a non-favored RAT is obtained by subtracting the fixed block bandwidth from the minimum required transmission bandwidth and dividing the result by the pooled block bandwidth, with the total result ceiled to the closest integer. Therefore, the number of pooled blocks assigned to a favored RAT is equal to the total number of pooled blocks minus the number off pooled blocks assigned to non-favored RATs. Blocks may be arranged in any manner without affecting user connection. The radio resource assignment function (402), (402'), (402") of each RAT receives the pooled block assignment information for the next assignment frame from the pooled block assignment function and assigns radio resources to users accordingly.

To avoid disrupting the operation of employed RATs, configuration of pooled block assignment at any AP is unaltered and maintained for a minimum time period, referred to as the assignment frame, equal to the LCM of the transmission frame durations of employed RATs multiplied by an integer number; as system traffic fluctuates at a time scale significantly larger than transmission frame durations. Furthermore, the ability to assign and move users between different carriers and radio frequency bands, using the radio resource assignment function, maintains continuous user connectivity in the system: the radio resource assignment function for a RAT moves UEs utilizing a specified RAT to access a specific pooled block to a different block (fixed or pooled) that is assigned to the same RAT prior to the reassignment of the specific pooled block to a different RAT.

Figure 9:
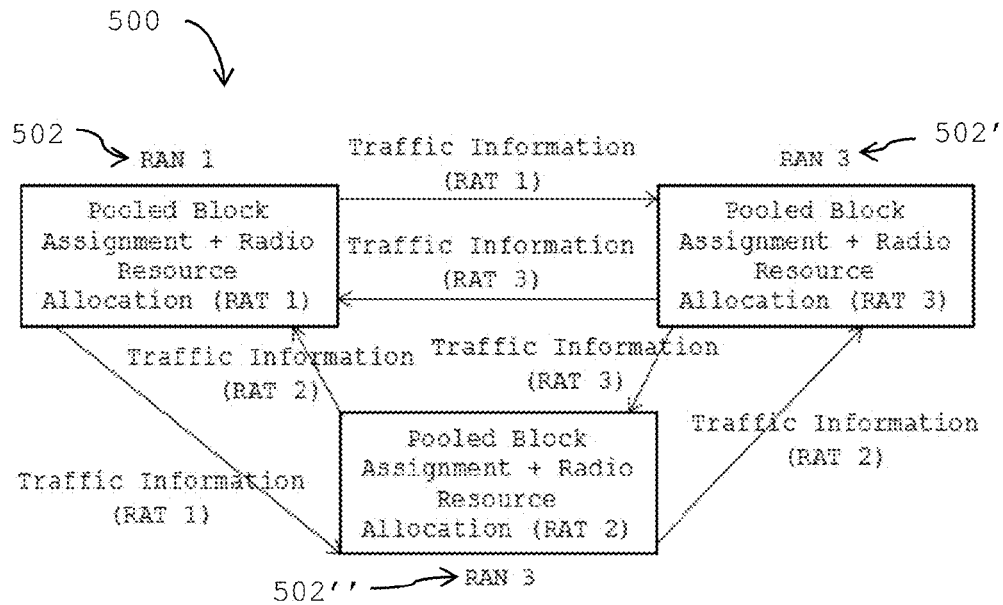
FIG. 9 illustrates distributed implementation of pooled block assignment.
Figure 10:
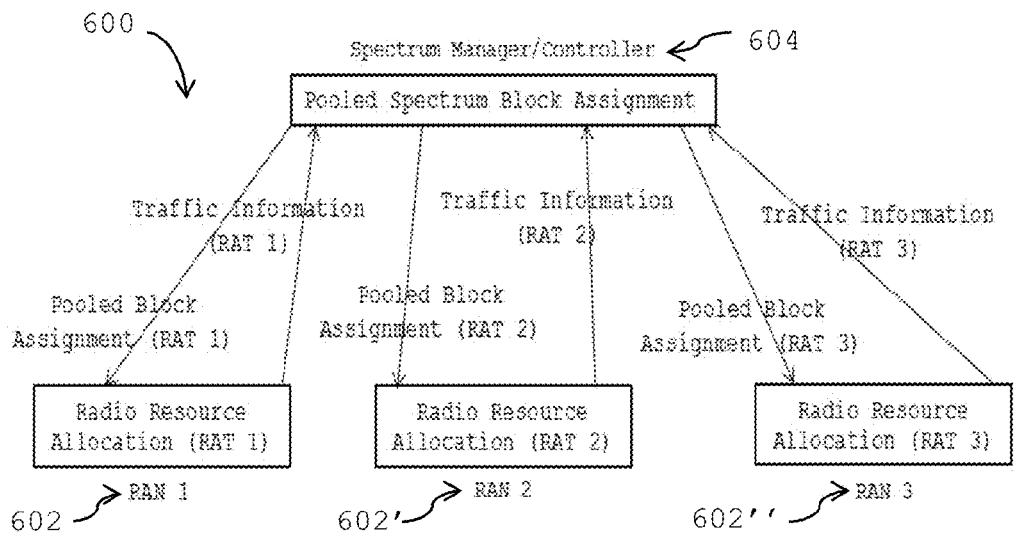
FIG. 10 illustrates centralized implementation of pooled block assignment.
Figure 11:
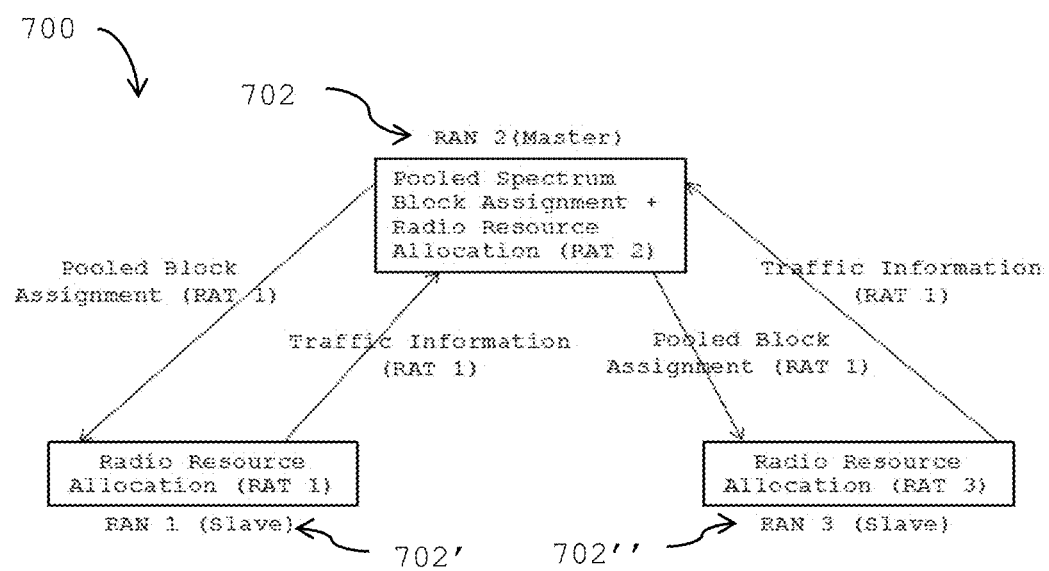
FIG. 11 illustrates master-slave centralized implementation of pooled block assignment.

FIGS. 9, 10 and 11 illustrate three implementations of the pooled spectrum block assignment function (404).

FIG. 9 illustrates a distributed implementation (500). The pooled block assignment function is implemented in the RAN element (502), (502'), (502") performing radio resource management (APs, APCs or DUs depending on RAN architecture) for each RAT and the RAN elements performing radio resource management of all RATs are interconnected. The RAN element performing radio resource management at each RAT provides its counterparts at all other RATs with the RAT traffic information and minimum required transmission bandwidth at each AP/RU. With the knowledge of traffic information at all other RATs, the RAN element performing radio resource assignment also applies the pooled block assignment functions as FIGS. 9 shows.

FIG. 10 illustrates a centralized implementation (600). The pooled spectrum block assignment function is implemented in an independent spectrum manager/controller (604) that connects to the RAN element (602), (602'), (602") performing radio resource management at each RAT (AP, APC or DU depending on RAN architecture) and assigns pooled spectrum blocks to each RAT based on the traffic loading/minimum required transmission bandwidth information received from the radio resource management function of each RAT.

FIG. 11 illustrates a master-slave implementation (700). The RAN element (702) performing radio resource management (AP, APC or DU depending on RAN architecture) at one RAT, designated as the master RAT, is connected to the RAN elements (702'), (702") performing radio resource management (APs, APCs or DUs depending on RAN architecture) of all other RATs, referred to as slave RATs. RAN elements (702'), (702") performing radio resource management at slave RATs provide the RAN element (702) performing radio resource management at the master RAT with the traffic loading/required transmission bandwidth information. The RAN element (702) performing radio resource management at the master RAT then assigns pooled spectrum blocks to the RAN elements performing radio resource management at the slave RATs.

Although the foregoing has been described with reference to certain specific embodiments, various modifications thereto will be apparent to those skilled in the art without departing from the spirit and scope of the invention as outlined in the appended claims. The entire disclosures of all references recited above are incorporated herein by reference.

We claim:

1. A system for autonomous spectrum assignment for a cellular wireless communication network, the system comprising a cellular communication network access point configured to support a plurality of radio access technologies, and a computing device comprising a radio resource management unit, the cellular communication network access point in communication with the radio resource management unit, the radio resource management unit configured to:
   receive an available spectrum for the cellular communication network access point to be made accessible over the plurality of radio access technologies;
   segment the available spectrum into a plurality of spectrum blocks comprising a set of fixed blocks and a set of pooled blocks;
   assign at least one of the fixed blocks to each of the plurality of radio access technologies;
   determine traffic conditions for the plurality of radio access technologies; and
   assign each of the pooled blocks to one of the radio access technologies on the basis of the traffic conditions, the pooled blocks are commonly assigned based on communications with additional radio resource management units on additional computing devices such that each radio resource management unit is in communication with a different pool of at least one cellular communication network access point.

2. The system of claim 1, wherein the traffic conditions comprise system traffic reflected as utilization of available spectrum and utilization of each radio access technology.

3. The system of claim 1, wherein each fixed block has a bandwidth greater than or equal to the respective radio access technology carrier bandwidth.

4. The system of claim 1, wherein each pooled block has a bandwidth greater than or equal to the least common multiple of the supported radio access technologies' carrier bandwidths.

5. The system of claim 1, wherein the fixed blocks are contiguous.

6. The system of claim 1, wherein the fixed blocks are non-contiguous.

7. The system of claim 1, wherein the fixed blocks are commonly assigned a system-wide.

8. The system of claim 1, wherein the computing device administers spectrum assignment for the cellular communication network access point and at least one additional cellular communication network access point.

9. A method for autonomous spectrum assignment for a cellular wireless communication network, the cellular communication network comprising a cellular communication network access point configured to support a plurality of radio access technologies, and a computing device comprising a radio resource management unit, the cellular communication network access point in communication with the radio resource management unit, the method comprising configuring the radio resource management unit to:
   receive an available spectrum for the cellular communication network access point to be made accessible over the plurality of radio access technologies;
   segment the available spectrum into a plurality of spectrum blocks comprising a set of fixed blocks and a set of pooled blocks;
   assign at least one of the fixed blocks to each of the plurality of radio access technologies;
   determine traffic conditions for the plurality of radio access technologies; and
   assign each of the pooled blocks to one of the radio access technologies on the basis of the traffic conditions, the pooled blocks are commonly assigned based on communications with additional radio resource management units on additional computing devices such that each radio resource management unit is in communication with a different pool of at least one cellular communication network access point.

10. The method of claim 9, wherein the traffic conditions comprise system traffic reflected as utilization of available spectrum and utilization of each radio access technology.

11. The method of claim 9, wherein each fixed block has a bandwidth greater than or equal to the respective radio access technology carrier bandwidth.

12. The method of claim 9, wherein each pooled block has a bandwidth greater than or equal to the least common multiple of the supported radio access technologies' carrier bandwidths.

13. The method of claim 9, wherein the fixed blocks are contiguous.

14. The method of claim 9, wherein the fixed blocks are non-contiguous.

15. The method of claim 9, wherein the fixed blocks are commonly assigned a system-wide.

16. The method of claim 9, wherein the each radio resource management unit administers spectrum assignment for the cellular communication network access point and at least one additional cellular communication network access point.

17. A system for autonomous spectrum assignment for a cellular wireless communication network co-deploying a plurality of radio access technologies, the system comprising:
   one or more computing devices;
   one or more radio resource management units located on the computing devices; and
   a plurality of cellular communication network access points, each cellular communication network access point in communication with one or more of the radio resource management units, the one or more radio resource management units configured to:
segment the available spectrum into a plurality of spectrum block comprising a set of fixed blocks and a set of pooled blocks;
assign at least one of the fixed blocks to each of the plurality of radio access technologies;
determine traffic conditions for the plurality of radio access technologies;
assign each of the pooled blocks to one of the radio access technologies on the basis of the traffic conditions, the pooled blocks are commonly assigned based on communications with additional radio resource management units on additional computing devices such that each radio resource management unit is in communication with a different pool of at least one cellular communication network access point, the spectrum is assigned at cellular communication network access points irrespective of a corresponding spectrum assignment for each of the other cellular communication network access points.

\* \* \* \* \*